United States Patent [19]
Ebner et al.

[11] 3,974,068
[45] Aug. 10, 1976

[54] ULTRAFILTRATION PROCESS AND APPARATUS USING LOW HYDROSTATIC PRESSURE TO PREVENT CONCENTRATION POLARIZATION

[75] Inventors: Heinrich Ebner; Anton Enenkel, both of Bonn, Germany

[73] Assignee: Firma Heinrich Frings, Bonn, Germany

[22] Filed: July 18, 1974

[21] Appl. No.: 489,778

Related U.S. Application Data

[63] Continuation-in-part of Ser. No. 202,376, Nov. 26, 1971, abandoned.

[52] U.S. Cl. ................................ 210/23 F; 210/75; 210/321 R; 210/433 M
[51] Int. Cl.² .................... B01D 31/00; B01D 13/00
[58] Field of Search ................ 210/22, 23, 321, 75, 210/353, 433, 346

[56] References Cited
UNITED STATES PATENTS

| | | | |
|---|---|---|---|
| 3,148,141 | 9/1964 | Schonenberger et al. | 210/22 |
| 3,367,787 | 2/1968 | Thijssen et al. | 210/22 X |
| 3,462,362 | 8/1969 | Kollsman | 210/321 X |
| 3,472,765 | 10/1969 | Budd et al. | 210/23 X |
| 3,483,867 | 12/1969 | Markovitz | 210/321 X |
| 3,490,590 | 1/1970 | Davies | 210/23 X |
| 3,494,465 | 2/1970 | Hyrop | 210/346 X |
| 3,541,006 | 11/1970 | Bixler et al. | 210/353 X |
| 3,579,441 | 5/1971 | Brown | 210/346 X |
| 3,705,100 | 12/1972 | Blatt et al. | 210/433 X |

OTHER PUBLICATIONS

Michaels, "New Separation Techniques for the CPI", from Chem. Eng. Progress, vol. 64, No. 12, copy in Gp. 176, pp. 31–43, Dec., 1968.

*Primary Examiner*—Frank A. Spear, Jr.
*Attorney, Agent, or Firm*—Jerry Cohen; Charles Hieken

[57] ABSTRACT

Liquids containing microorganisms, macromolecules or finely-divided solid matter in a liquid are filtration-concentrated by movement of the liquid containing such particles through an elongated tubular channel having membrane filters, as walls thereof, with flat surfaces and pore diameters between $10^{-2}$mm and $10^{-4}$mm, preferably $2 \times 10^{-4}$ to $3 \times 10^{-4}$mm. Laminar flow is maintained at the filter surface and forced transverse movement of contained particles into the filter is provided through a moderate static pressure head. The particle movement is in some embodiments supplemented by heavier particles used to transfer momentum to particles to be filtered thereby. Clogging of the filters is thereby reduced with resultant longer service life and longer intervals between filter maintenance or replacement.

27 Claims, 5 Drawing Figures

ULTRAFILTRATION PROCESS AND APPARATUS USING LOW HYDROSTATIC PRESSURE TO PREVENT CONCENTRATION POLARIZATION

CROSS REFERENCE TO RELATED APPLICATIONS

This application is a continuation-in-part of our copending U.S. application Ser. No. 202,376, filed Nov. 26, 1971, now abandoned incorporated herein by reference as though set out at length herein.

The invention relates to a process and a device for ultrafiltration of liquids that contain microorganisms, macromolecules or finely-divided solid matter, wherein the liquid to be filtered is moved parallel to the filter surface.

BACKGROUND OF THE INVENTION

For the effective separation of small particles such as microorganisms or macromolecules from a liquid, it is necessary to prevent clogging of the filter surface by suitable measures. The application of a thick layer of filtering aids on a rotating filter surface in revolving filters is well-known for this purpose; a thin layer is removed from the thick layer together with the separated particles during each rotation.

In another known process, definite quantities of kieselguhr are added continuously in measured amounts as a filtering aid to the liquid to be filtered, settle together with the filtered particles on the filter surface and, by means of their porosity and their grain size, prevent clogging of the filter surface for a limited time. From time to time, the built-up filter cake must be removed and a new filtration cycle commenced by depositing a new filter layer.

In common prior art filters, which may comprise vertical, horizontal and/or cylindrical services, there is no appreciable liquid flow parallel to the filter surface during filtration. In such common systems, static pressure increases in value up to several atmospheres during operation and very high static pressures are required in the first instance, to drive liquid through the filter surface. Static pressure is defined as the intrinsic liquid pressure acting perpendicular to boundary walls of the container therefore. The significance in this case being the membrane filter surface.

Fermented liquids, especially vinegar, wine, cider have been filtered until now by classic filtration methods only using filter surfaces (e.g. fine screens) precoated with Kieselgur or asbestos and pressing the liquid through this layer by means of static pressure between about 5 and 70 psi without any significant movement of the liquid parallel to the filter surface. Filter aid must continuously be added in order to keep the filter cake open as long as possible. After a certain time of filtration, while pressure increases, filter rate decreases to the extent that the filter cake must be washed out after interruption of the filtration and the procedure of precoating and filtration begins again. The different steps can be controlled by hand or automatically. The filter cake gives waste problems. The step of precoating is critical. Continuous dosing of filter aid and control of filter pressure are necessary. Filtration can be done during working hours only.

Apart from small laboratory models state of the art apparatus have been in use in technical scale for two basic purposes (In the following materials reference is made to reference R being an article by Porter et al, "Membrane Ultrafiltration", appearing in Chemical Technology, January, 1971, pages 59–63, and also to reference S, being an article by D. Michaels, "New Separation Techniques For the Chemical Process Industries", Chemical Engineering Progress, December, 1968, pages 31–43.)

a. "Ultrafiltration for hydraulic pressure activated separation of solutions into their individual components by passage through synthetic semipermeable membranes" and b. "Reverse Osmosis for separation of low-molecular weight solutes, e.g., salts, sugars, simple acids, etc. from their solvent (usually water)." (Page 32, lines 6 and 24, of Reference S, cited below)

"Ultrafiltration is the term applied to the separation of relatively high molecular weight solutes (e.g., proteins, natural gums, polymers, other complex organic compounds) and colloidally dispersed substances such as clays, pigments, minerals, latex particles, microorganisms, etc. from their solvents (usually water). In these systems the osmotic pressure of the solute is usually negligible and plays no important role in the separation process.

In *Reverse Osmosis*, the driving pressure for efficient separation must exceed the osmotic pressure of the solute in the solution." (Ref. S, page 31, lines 29 – 46), "Therefore for Reverse Osmosis pressures between 500 and 2000 psi are often required". (Page 57, line 24, Reference R, cited below)

But also Ultrafiltration of high-molecular-weight solutes and or colloidally dispersed substances are two different methods. In Ultrafiltration of solutes concentration polarization produces a "boundary layer of substantially more concentrated solution (relative to the midchannel concentration) adjacent to the membrane" (Ref. S, page 35 last four lines).

"If the solution is sufficiently concentrated and the solute of relatively low molecular weight, the high solute osmotic pressure in the boundary layer will reduce the effective pressure for ultrafiltration, thereby reducing the ultrafiltration flux. If the solution contains a high-molecularweight solute or colloid, solute accumulation at the membrane surface produces a layer of finite, and frequently large, hydraulic flow resistance." (Ref. S, page 36, lines 30 – 43).

"This accumulation leads to formation of a "slime" or "cake" on the membrane, which increasingly impedes solvent flow through the membrane until convective transport of solute towards the membrane surface equals the rate of back diffusive transport away from the membrane." (Ref. R, page 59, lines 21 – 26, right column).

Therefore to avoid concentration polarization during Ultrafiltration of solutes, the task is to remove a higher concentrated *liquid layer* from adjacent the membrane.

Unless otherwise indicated references herein to % are weight per cent and references to lengths, height, diameters weights and cross-section ratios of suspended particles are to worst cases of such parameters for design purposes.

"High-molecular-weight solutes, such as the proteins and *colloidal dispersions* when concentrated beyond a certain point form solid or thixotropic gels" (Ref. R, Page 60, lines 1 - 4).

To avoid concentration polarization during Ultrafiltration of colloidally dispersed solids, the task is to avoid a layer of solids on the membrane.

This is a problem which has been solved by the present application. In contrast the prior art uses the following approaches:

a. Reverse Osmosis: "For relatively low permeability membranes, e.g. 10 - 20 gfd at 500 - 1500 psi, and solutes such as sodium chloride, polarization moduli can be held to reasonably small values (1.5) in even rather large membrane bounded conduits ( 1 in. tubes, ¼ in. slits) and with moderate fluid velocities in turbulent flow." (Ref. S, page 36, last two lines — page 37, line 7)

In other words, there is no special polarization problem in the reverse osmosis process in spite of the high pressures used in such process.

b. "Ultrafiltration of high-molecular-weight solute containing solutions of colloidal dispersions, presents polarization problems of yet a different dimension." (Ref. S, page 37, line 41).

"Because of the extremely low diffusion coefficients of macromolecules and colloids in solution, the minimization of polarization (and realization of high ultrafiltration rates) is far more critical than in the case of microsolutes. In turbulent flow systems, astronomically high fluid velocities, large pressure drops and necessarily high fluid recirculation rates are required to achieve ultrafiltration rates much over 10 - 15 gfd. On the other hand, by operating in the laminar flow regime, at quite low fluid velocities in thin channels ( 5 - 20 mils), fluxes as high as 70 - 75 gfd can be realized with very low energy input and little to no fluid recirculation." (Ref. S, page 37, last four lines — page 38, line 9).

"These systems cannot, of course, accept process streams which contain significant amounts of coarse suspended matter. Such streams must either be prefiltered settled or centrifuged to remove large particles prior to ultrafiltration, or processed in wide conduit, turbulent flow systems at much lower ultra-filtration rates." (Ref. S, page 38, lines 16 - 25)

German Pat. No. 1,020,000 discloses a process for separating a solution of diverse molecular composition by ultrafiltration at high pressure by means of semipermeable membranes, in which the solution is forced along at the membrane so that it is maintained in the immediate vicinity of the membrane in a continual turbulent motion. The membrane should have a rough profile for this, at least in the longitudinal cross-section. The patent also calls for assuring homogeneity of the liquid using turbulence generated in the liquid. Solid matter is not present in the liquid. Pressures of, for example, 10 atmospheres are provided for.

German Pat. No. 1,154,439 describes a process for the extraction of solid matter in enriched and purified form, wherein a suspension is guided past a filter, impermeable to the solid matter, in the circulation circuit above a supply vessel, with a change of the transport direction executed at definite time intervals, whereby eddy currents are formed and the solid matter should be retained in front of the filter. Extraction of the solid matter is subsequently accomplished by flushing back.

The above described processes have the disadvantage that they cannot be used for continuous filtration of liquids that contain microorganisms, macromolecules or solid matter since the proposed measures are insufficient to completely prevent clogging of the particles on the filter.

It is the object of the present invention to provide a process in which these disadvantages are eliminated which is suited both for extraction of large quantities of filtrate and also of the solid matter to be filtered in enriched form.

It is a further object of the invention to provide distinctly advantageous apparatus for the process.

SUMMARY OF THE INVENTION

The invention is particularly suited for the continuous filtration of liquids that contain microorganisms, or finely-divided solid matter wherein the liquid to be filtered is moved parallel to the filter surface. It consists in providing a membrane filter with a smooth flat surface and a normally acting static pressure head smaller than three meters (4.2 psi) water column is maintained on the filter surface. The filter has a pore diameter between $10^{-2}$ and $10^{-4}$mm, preferably $2 \times 10^{-4}$ to $3 \times 10^{-4}$mm by means of suitably chosen flow speed, a force acting parallel to the filter surface is exerted on the particles in the liquid, which force exceeds the static friction of the particles at the membrane filter determined by the static pressure, and a laminar flow is maintained at the filter surface; the present invention makes it possible for the first time to subject liquids, particularly fermented liquids, which as noted above clog filter kegs and filters and require continuous addition of filter aid, to be continuously subjected to ultrafiltration for weeks, working day and night without interruption and automatically thereby removing bacteria from the liquid.

According to Bernoulli's Law, the sum of the velocity head, position head and static pressure head remains constant in a flowing liquid.

$$\frac{v^2}{2g} + Z \frac{+P}{\rho g} = \text{constant}$$

where $v$ is the liquid's speed, $Z$ the position head, $p$ the static liquid pressure, $\rho$ the density and $g$ the gravitational acceleration. The individual pressure heads are suitably indicated in meters of water column. With equal position heads, the sum of the velocity head and the static pressure head remains constant. Moreover, the velocity head sets in the direction of the flow and the static pressure head on all sides perpendicular to the flow direction.

If one now constructs the walls of a system in which liquid flows at filter surfaces, then the liquid and solid particles are pressed by the static pressure perpendicular to the filter surface while the dynamic liquid pressure tends to move the particles along the filter surface. A clogging of the particles at the filer may be prevented if the force acting on the individual particles parallel to the filter surface overcomes the static friction of the particles at the membrane. Moreover, a laminar flow of the liquid must be provided in such fashion that the dynamic pressure acts exactly in the flow direction. Turbulence leads to a partial settling of the solid particles on the filter surface. In order to keep the static friction as small as possible, a membrance filter with a smooth surface is used. The pore diameter should be smaller than the particles to be separated, effectively between $10^{-2}$ and $10^{-4}$mm, preferably $2 \times 10^{-4}$ to $3 \times 10^{-4}$mm.

Bacteria frequently have elongated form; for example, rods with $1 \times 10^{-3}$mm length and $3 \times 10^{-4}$mm diameter. If such a particle is forced by the static pressure onto the filter surface, this pressure always acts on the maximum cross-sectional area of the particle of $3 \times 10^{-7}$mm$^2$ since the particles are laid down flat on the filter surface. However, the dynamic pressure which the particle is to retransmit usually acts on the minimum cross-sectional area of the particles $(3 \times 10^{-4})^2 \pi /4 = 7 \times 10^{-8}$mm$^2$
if the particle does not happen to lie transverse to the flow direction. The particle's maximum cross-sectional area is denoted by $Q$, the particle's minimum cross-sectional area by $q$ and the coefficient of friction of the particles at the filter by $\lambda$. Then, in order to prevent settling of the particles at the filter with certainty, we must have:

$$q \cdot \frac{V^2}{2g} \cdot \rho > Q \cdot \frac{P}{\rho \cdot g} \cdot \rho \cdot \lambda$$

It follows from this that $$\frac{V^2}{2g} > \frac{Q}{q} \cdot \frac{P}{\rho \cdot g} \lambda$$

or $$V > \sqrt{2g \cdot \frac{Q}{q} \cdot \frac{P}{\rho g} \lambda}$$

Therefore, the velocity head $v^2/2g$ determined by the liquid motion parallel to filter surface should preferably be adjusted so that it is greater than the product of the static pressure head times the coefficient of friction of the particles on the filter surface times the ratio of the maximum to the minimum crosssectional areas of the particle. The flow velocity to be chosen is thus proportional to the square root of the static pressure, the square root of the cross-sectional area ratio of the particles and the square root of the coefficient of friction.

For the bacteria mentioned as an example, with $1 \times 10^{-3}$mm length and $3 \times 10^{-4}$mm diameter, the cross-sectional area ratio is 4.3 and is thus quite favorable.

This cross-sectional area ratio can be altered by an artifice in which one adds to the liquid to be filtered a filtering aid consisting of particles whose individual particle masses exceed those of the particles to be filtered by at least two factors of ten (i.e. 100 times or more). The cross-sectional area ratio of these added particles should lie preferably between 1.0 and 2.0, in particular and for distinct advantage between 1.0 and 1.5. It follows from the cited formula that the liquid's velocity can be reduced by half if the cross-sectional area ratio is reduced from 4 to 1. The relatively large masses of the filter-aiding particles has the result that these particles transfer their momentum $mv$ to the particles to be filtered without thereby reducing their own velocity by more than an insignificant amount.

There would be considerable reduction of filter aid velocity due to collision with the particles to be filtered if the masses of the filter-aiding particles were of the same order of magnitude as the masses of the particles to be filtered. Furthermore, a filtering aid should be used whose particles have a coefficient of friction at the membrane filter that is smaller than 0.3. Suitable filtering aids are particles with smooth and nonangular surfaces that do not damage the membrane filter; for example, celluose particles, especially mechanically cut wood pulp particles, but also chemically purified cellulose. Other filtering aid materials which may be used are, particles of plastics, e.g. polyvinylchloride, polyethylene, polypropylene or polyester, subject to the foregoing criteria. It has proven particularly advantageous to use as filtering aid wood pulp particles in an amount of 0.01 – 1.0% by weight, preferably 0.01 – 0.1% by weight with respect to the liquid to be filtered or similar amounts of the other filtering aid choices.

According to a particular embodiment of the process according to the invention, following the motion parallel to the filter surface, the nonfiltered portion of the liquid to be filtered is collected in an intermediate container, removed from there anew and moved parallel to the filter surface, and this process repeated suitably often. The level in the intermediate container is kept constant by inflow of fresh liquid to be filtered. The filtrate flowing off through the filter element is continuously or intermittently pumped out. The filtering aid is suitably added only to the liquid flowing in the circuit between the intermediate container and the filter surface and its quantity limits set out above should be with respect to that liquid's volume. This preferred embodiment makes it possible to filter a large quantity of liquid with a small quantity of filtering aid. Many devices are conceivable to carry out the process according to the invention. However, according to the invention, a device is used which has at least one container for the liquid to be filtered, a centrifugal pump connected therewith by a pipe, a filter element connected therewith by a pipe and a pipe that leads back from there into the container and is distinguished in that the filter element with horizontal flow direction has a rectangular inner cross-section and the two vertical sides of the rectangle are formed of membrane filters.

Moreover, the filter element suitably has a middle rectangular filter frame and two filter plates arranged on both sides of the filter frame, wherein the filter frame has inflow and outflow channels at the end faces and the filter plates have, on their sides directed toward the filter frame, grooves to collect the filtrate and also a porous base to support the membrane filters and filtrate discharges. Furthermore, a membrane filter and a seal are arranged between the filter frame and each filter plate. In one embodiment, the filter frame is conically enlarged at the end faces and the inflow and outflow channels change over outside the filter frame with constant cross-sectional area into circular pipes. The maintenance of the cross-sectional area and the slow transition are essential for the formation of laminar flow. The conical enlargement of the filter frame serves to concentrate the liquid flow at the membrane filter.

A particularly suitable construction of the device according to the invention further comprises an intermediate container equipped with a level regulator for the liquid to be filtered which is connected by a conduit to a main container, and by means of a conduit which leads from the intermediate container, across the centrifugal pump, a temperature device and one or more filter elements and back again to the intermediate container, wherein the filtrate discharges from the filter plates discharge through a conduit into a filtrate container from which a filtrate pump continuously or intermittently pumps the filtrate in the filtrate container through a pipe. The intermediate container makes possible the use of very small quantities of filtering aid. Several filter elements are advantageous if a larger surface is desired, although membrane filters are not available in any length one may desire. The filter elements preferably are connected in series. However, if the static pressure is thereby raised substantially above the indicated limiting value, parallel connection should be used instead. The filtrate container preferably is equipped with electrodes which control the filtrate pump and thereby automatically pumps the filtrate into a collection container at definite time intervals. Such a device is capable of filtering automatically day and night for months. To interrupt the filtration in the event of a leak in a filter element, the filtrate pipe can have a photoelectric gate which stops the cenrifugal pump when turbidity occurs, whereby the filtration comes to a standstill.

The process of the present claimed invention enables a new sphere of operations in ultrafiltration of dispersed solids. It allows long continuous running between flushing or wash out steps. It allows practical large dimensions of apparatus consistent with maintenance of laminar flow at low energy inputs while the prior art requires either high fluid velocities, high pressure and high energy or very short channel lengths and heights to hold laminar flow. The invention makes effective use of much less than one weight per cent filter aid particles while the prior art uses higher concentrations of filter aid particles.

The term "mechanical wood pulp particles" refers broadly to mechanically cut, as opposed to chemically digested particles and does not imply to those skilled in the art any particular shape or type of particle.

Other objects, features and advantages of the present invention will be apparent from the following detailed description of preferred embodiments taken in connection with the accompanying drawing in which:

BRIEF DESCRIPTION OF THE DRAWINGS

The device according to the invention is clarified by the attached drawings wherein.

DETAILED DESCRIPTION OF PREFERRED EMBODIMENTS

Figure 1:
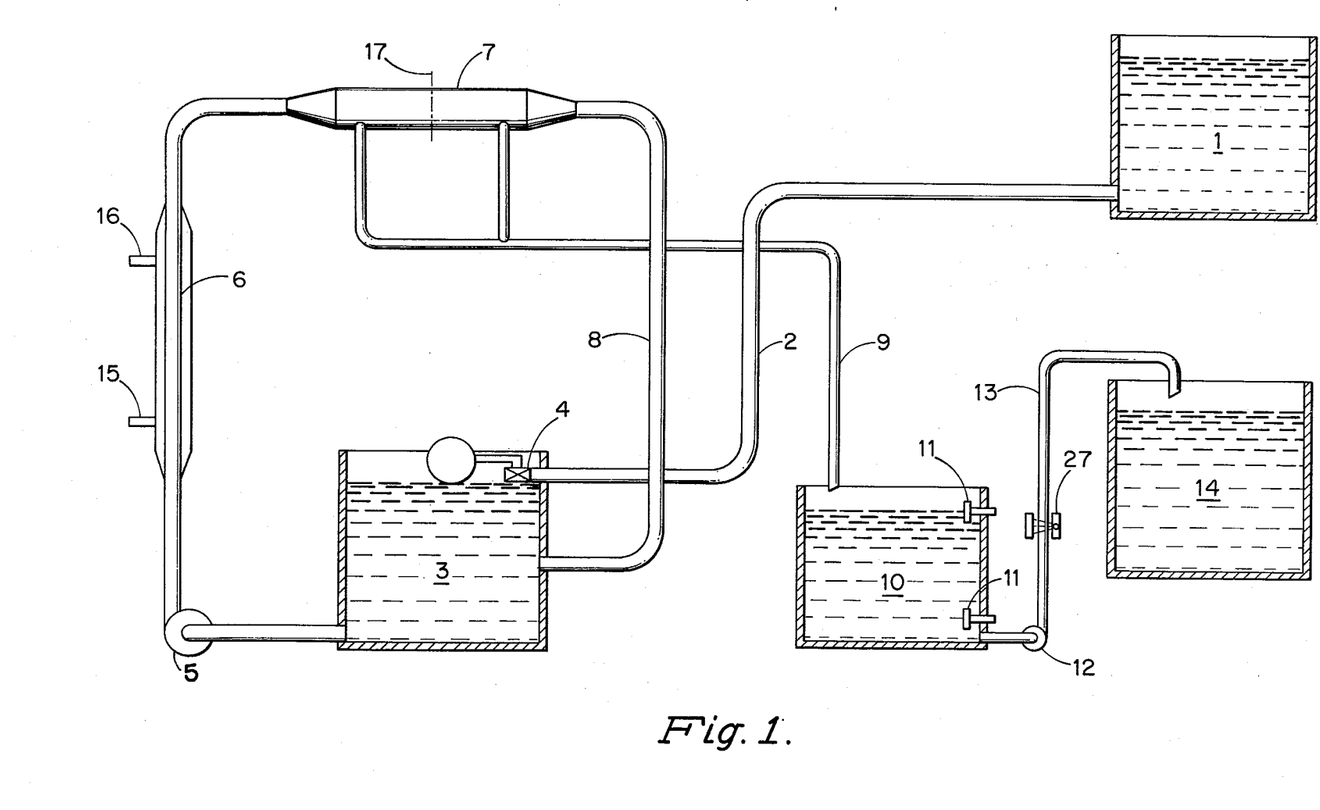
FIG. 1 shows a schematic arrangement of the entire filtration device.

According to FIG. 1, the liquid to be filtered is situated in an upright main container 1. By means of a conduit 2, this main container is connected to the intermediate container 3, with the level in the intermediate container being regulated by a float valve 4. By means of the centrifugal pump 5 the liquid to be filtered is pumped across the cooler 6 through the filter element 7 and across the conduit 8 in the circuit. The filtrate flows through the conduit 9 into the filtrate container 10 which is equipped with electrodes 11 which control the filtrate pump 12 which from time to time pumps the filtrate through the conduit 13 into the collection container 14. A photoelectric gate 27 monitors the filtrate and stops the centrifugal pump 5 if, e.g., due to a defective filter surface, turbid filtrate arrives in the filtrate container 10.

Figure 2:
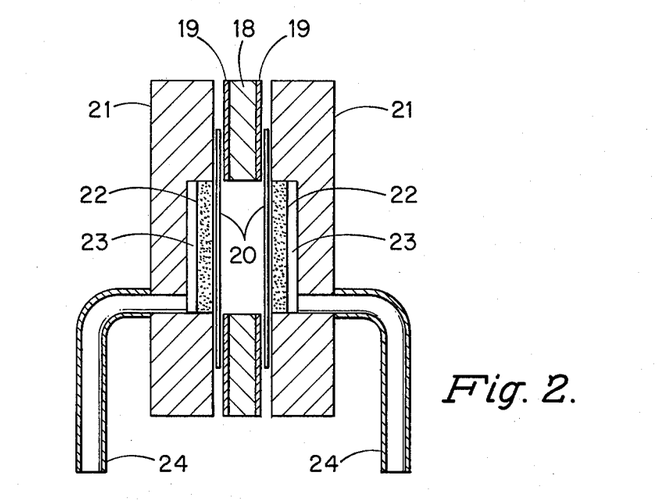
FIG. 2 is a cross-section through a filter element.
Figure 3:
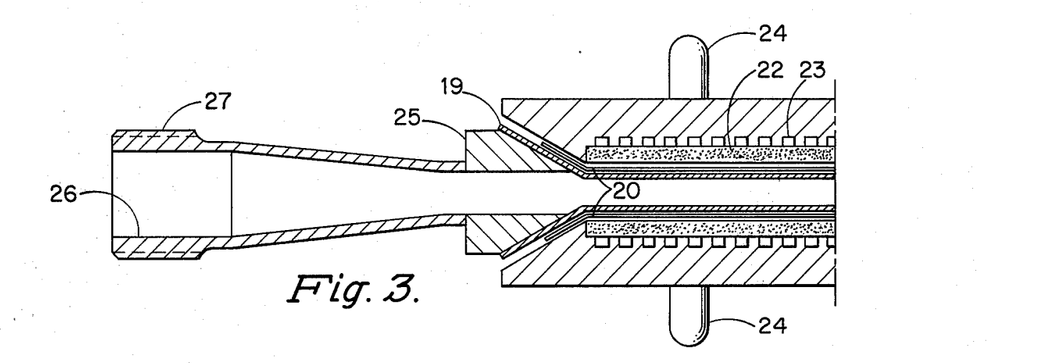
FIG. 3 is a partial longitudinal section through a filter element.

FIG. 2 shows a section through the filter element 7 along the line 17, and FIG. 3 a corresponding longitudinal section. The filter frame 18 supports two seals 19 on which the membrane filters 20 are pressed by the filter plates 21. The filter plates 21 bear porous bases 22 to support the membrane filters and grooves 23 and discharges 24 for the filtrate. The liquid flow follows in the middle between the frame 18 and the membranes 20 perpendicular to the place of the drawing of FIG. 2.

Figure 4:
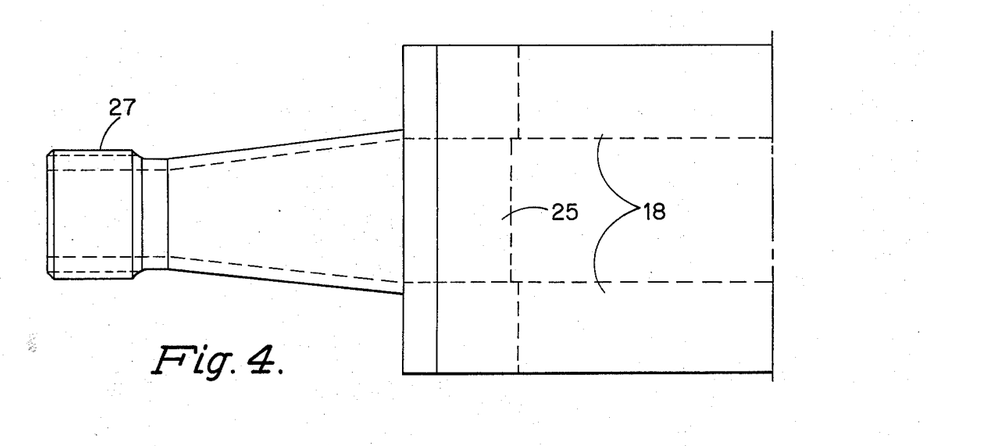
FIG. 4 is a top longitudinal view of the filter frame.

As FIGS. 3–4 show, the filter frame 18 has circular to rectangular conical enlargements (in one plane) 25 at the inflow and outflow sides, between which is extended the liquid channel 26 which changes outside the filter frame while maintaining the same cross-sectional area, into circular pipes with pipe connections 27.

The process and the device according to the present invention exhibits important advantages relative to hitherto known filtration methods and apparati, especially the capability for protracted continuous operation with a minimum of supervision. These advantages become especially conspicuous when one is concerned with the filtration of liquids that previously were known as being hard to filter such as, for example, liquids enriched with microorganisms or liquids that contain macromolecules or protein.

The following non-limiting examples illustrate the utilization of the invention.

EXAMPLE 1

Alcohol vinegar produced by submersed acetic fermentation was filtered. It contained approximately $3 \times 10^{12}$ vinegar bacteria per liter having a length of about $1 \times 10^{-3}$ mm and a diameter of $3 \times 10^{-4}$ mm. If one attempts to filter such vinegar free of bacteria in one step by the conventional art, then one can fit a membrane filter with $2 \times 10^{-4}$ mm pore diameter into a porcelain suction funnel, fill the latter with the vinegar and apply a vacuum of 60 mm mercury over a suction bottle with the aid of a water-jet vacuum pump. However, the filtration already comes to a standstill after 3 hours. Only about 145 ml of filtrate are sucked through a filter surface of 8.8 cm$^2$; the bacteria in a thin layer then completely slog up the filter surface.

EXAMPLE 2

The same vinegar as in Example 1 is filtered with a device according to the invention as described above using the same membrane filter. The filter surface is 340 cm$^2$; the liquid is pumped past it with a speed of 3.5 m/sec. using a circulating pump without the filtering aid being added. The static filter pressure $p$ is adjusted e.g. to 0.320 m water column. In a 21-day long experiment with filtration efficiency decreasing slowly from 78.5 l/m$^2$/h to 45 l/m$^2$h, 920 liters of bacteria-free filtered vinegar are obtained. The dynamic pressure $v^2/2g$ is 0.620 m water column. If one computes with a cross-sectional area ratio of 4.3 for the bacteria, there results that the coefficient of friction of the vinegar bacteria at the filter is smaller than 0.48.

EXAMPLE 3

In the device used in Example 2 with the same filter, a constant filter efficiency of 38 l/m²/h was achieved over 14 days with a flow velocity of 3.5 m/sec and a static pressure of 0.400 m water column. From this we compute $\lambda = 0.36$. With a somewhat higher static pressure of 0.581 m water column, the efficiency falls in 10 days from 100 l/m²/h to 32 l/m²/h. From this follows $\lambda > 0.25$. The coefficient of friction of the vinegar bacteria at the filter can thus be assumed to be about 0.3.

EXAMPLE 4

The vinegar described in Example 1 is filtered in a device according to the invention and mixed in the intermediate container with 0.04% mechanical wood pulp particles. The filter has a filter surface of 36 cm². The liquid to be filtered is pumped past the membrane filter with a speed of 1.5 m/sec and a static pressure of 1.5 m water column. In 35 days, 146 liters of vinegar are filtered free of bacteria through this filter, with the efficiency decreasing slowly from 60 l/m²/h to 40 l/m²/h. The decline was generated by the thickening. The bacteria were concentrated 30 fold in the circuit during this process. After being emptied and briefly washed thoroughly with water, the filter again demonstrated the full starting efficiency using fresh vinegar mixed anew with 0.04% mechanical wood pulp particles. This shows that no particles at all accumulated on the filter. The cross-sectional area ratio of the mechanical wood pulp particles can be assumed to be about 1.1. The dynamic pressure is only 0.115 m water column. From this, the coefficient of friction of the mechanical wood pulp particles is calculated at about 0.07.

With a smaller flow velocity, a substantially more rapid decrease of the filtration efficiency occurs. Thus, e.g. with 1 m/sec flow velocity and 0.600 m water column static pressure a drop from 57.5 l/m²/h to 40.0 l/m²/h was already established within 11 days. This results in $\lambda < 0.08$. At 1.6 m/sec and 1.7 m water column, the efficiency sank within 15 days only from 47 l/m²/h to 40 l/m²/h. From this results $\lambda = 0.07$. In so doing, the bacteria concentration was raised up to 40 times normal concentration. Satisfactory operation could be maintained even up to 200 times bacteria concentration.

After removing the concentrate and returning to normal bacteria concentration in vinegar, the filter efficiency immediately increased again after 63 days operation to 72 l/m²/h. After 180 days of filtration over the same membrane filter, interrupted briefly only three times to remove the bacteria concentrate, there is no discernible drop in the filter efficiency. During this time, 793 liters of vinegar were filtered free of bacteria.

Supplementing the tests given in Examples 1–4 of the present application, the following additional tests were performed to analyze the effects of going below and above the claimed pressure limits of the present invention.

EXAMPLE 5

Figure 5:
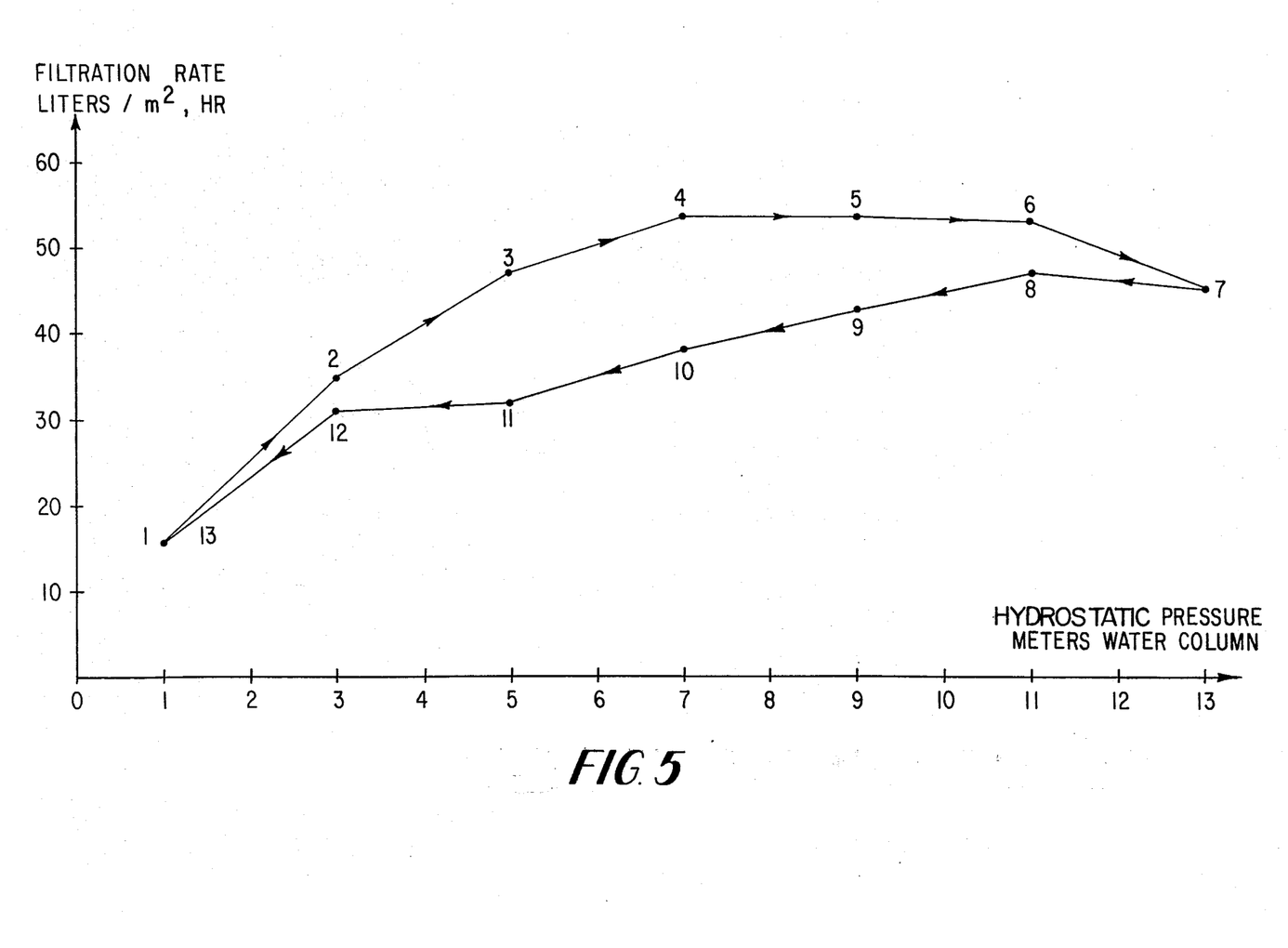
FIG. 5 is a curve of filtration rate vs. time illustrating the concentration polarization avoidance through the present invention.

Alcohol vinegar as in Example 1, was filtered through a filter construction according to the present invention having $2 \times 10^{-4}$ mm. pore diameter, 100 cm² filter surface, 9.3 mm channel height, and 167 mm channel length. Operating with .04% by weight filter aids and at 1.3 m/sec fluid velocity and 1 m water column static pressure, the system was run for 1 hour (Run 2). Then it was run at 3 m pressure for 1 hour (Run 2). And then successively for one hour each at a pressure, in meters of water column, of 5 (Run 3), 7 (4), 9 (5), 11 (6), 13 (7), 11 (8), 9 (9), 7 (10), 5 (11), 3 (12) and 1 (13). The results of such tests are plotted in the filtration rate vs. hydrostatic pressure graph of FIG. 5, in which points 1–13 correspond to Runs (1) – (13) at the above indicated pressures and in which it is shown by the spread between filtration rates in first and second filtrations at the same pressure that polarization concentration is severe at pressures above the claimed pressure limit of 3 m (4.2 psi) but disappears below such limit. That is the curve from point 1 to point 7 shows the dependence of the filtration rate on the increasing static pressure. The curve from point 7 to point 8 shows the dependence of the filtration rate on the decreasing static pressure. The difference between two filtration rates at the same pressure is a criterion for the concentration polarization which occurred during the time which elapsed between these two points. For example at a hydrostatic pressure of 7 meters water column (10 psi) the filtration rate was 53 liters per square meter an hour when pressure was increased to this value, but was as low as 38 l/m², hr only, 5 hours later, when pressure meanwhile was gradually increased to 9, 11 and 13 m and reduced again to 11, 9 and 7 m, within these 5 hours. This is a reduction of 28% due to concentration polarization. But at 3 m pressure this reduction was from 35 to 31 l/m², hr, only, that is 11% during 9 hours while pressures had gone up to 13 m. At 1 m pressure there was no reduction at all, if one returned to this point after 11 hours at pressures up to 13 m. It can be stated from these results that certainly a pressure around 1 m water column gives no concentration polarization at all and that at 3 m it is still very small.

EXAMPLE 6

To corroborate this result the system was run without change in the apparatus at constant fluid velocity of 1.3 m/sec during 25 days, changing the pressure after 5 days only in the following sequence. The static pressures were always held constant for 5 days and gave the following changes of filtration rates during these 5 days.

| Pressure | Filtration Rate (l/m², hr) | |
|---|---|---|
| | 1st hour | 120th hour |
| 5 m | 39 | 28 |
| 2.5 | 18 | 20 |
| 8 | 38 | 30 |
| 12 | 38 | 29 |
| 10 | 28 | 23 |

Filtration rates at static pressures of 5, 8, 10 and 12 m water column (7.1 to 17 psi) showed a decrease up to 28% due to concentration polarization while filtration rate at 2.5 meters (3.5 psi) showed an increase in filtration rate of 10%. This proves that the pressure limit where concentration polarization begins lies higher than 2.5 meters (3.5 psi). One more long-term-test covering 127 days was added:

EXAMPLE 7

A larger filtering apparatus was built having 750 cm² (473 mm long, 7 mm channel height) filter surface and operated for filtering the same type of alcohol vinegar as in the previous examples at speeds of 1.6 – 2 m/sec. and 1.7 m water column static pressure with the following observations After 32 days at 1.6 m/sec, the filtration rate went from 50 l/m² hr to 32 l/m² hr and the vinegar bacteria were concentrated in the recycled liquid by a factor of 187 times.

After flushing and 30 further days of similar filtration 2.0 m/sec and 1.7 m pressure, the filtration rate was held constant at 40 l/m² hr throughout the 30 days.

After flushing and further operation at 2.0 m/sec and 1.7 m pressure for another 25 days, the filtration rate went from 50 to 38.

After flushing and further operation at 2.0 m/sec. and 2.0 m pressure for 40 days, filtration rate went from 48 to 40.

Through the 127 days of varying operation described above 9,570 liters of bacteria-free vinegar were produced, 50 liters of bacteria concentrate were collected and 80 grams of filter aid (wood-cut-particles) were used throughout this time.

Example 7 shows that working with a membrane filter, having 7 mm channel height, being 473 mm long at fluid velocities between 1.6 and 2.0 m/sec and a pressure of 1.7 m water column (2.4 psi) permits continuous filtration of alcohol vinegar. The slight decrease in filtration rate during 40 days is due to the increasing bacteria concentration in the recycled liquid and disappears immediately if this concentrated recycled liquid is taken out. No concentration polarization occurs under these conditions, which are within the limits of the claims of the present application. With relation to the recycled liquid the amount of filter aid added was .04% (weight/vol.) With relation to the total amount of vinegar filtered the amount of wood-cut-particles used was 2.1 ppm only. Bacteria concentrate amounted to .5%. Never before, to my best knowledge, a similar efficiency in filtering vinegar has ever been possible. Classic methods cannot run uninterruptedly day and night without supervision and need between .5 and 2% of filter aid. Membrane filtration could not be used before because of polarization concentration, diminishing the filtration rate very fast to an uneconomical extent. The new claimed method made it possible for the first time to use ultrafiltration for treatment of vinegar produced by submerged fermentation containing Acetobacter in an amount of about 80 mg/l dry substance. 99.5% bacteria-free vinegar and .5% bacteria concentrate with about 1.5% dry substance resulted.

(END OF EXAMPLES)

As the Examples demonstrate, the transitions are progressive. In industrial operation, the flow velocity and the static pressure are chosen so that with minimum power consumption the best and longest filtration efficiency is obtained, which again depends also on the substrate to be filtered.

With a given hydraulic diameter (D) and solution viscosity (vis.), which are in fact fixed in the course of any given process, the only adjustable variable which we employ is velocity (v) to assure laminar flow in accordance with the equation:

$$R_e \text{ (Reynolds No.)} = \frac{(v)(D)}{(vis.)}$$

where turbulent flow occurs at above about 100,000 $R_e$ in the smooth walled channels of ultrafiltration equipment.

We also employ velocity together with static pressure adjustment to ensure that dynamic pressure head ($V^2/2g$) exceeds frictional resistance to movement which is $$\frac{P}{\lambda} \cdot \frac{Q}{q}$$
$$\frac{}{\rho g}$$

where $P$ is static pressure, $\lambda$ is worst coefficient of friction of the bacteria or other solids to be filtered or of the filter aid paticles, $\rho$ is density of the liquid and $Q/q$ is worst cross-section area ratio of the bacteria or other particles. The apparent limiting conditions are dimensions and coefficient of friction of the bacteria and are adjustable in practice by use of a small amount of filter aids.

In a typical case, the filtration of the foregoing to determination of useful velocity would comprise the following analysis: A typical filter has 125 mm wide and 10 mm high channels for a hydraulic diameter of .0185 m and vinegar has a kinamatic viscosity of $1.25 \times 10^{-6}$ m²/sec. Therefore, to hold below 100,000 limiting Reynolds number, $v$ must not exceed 6.76 m/sec. Of wood-cut-particles, used as filter aid, $Q/q$ will be found to be 1.1 and $\lambda = .07$ both within very close limits and to maintain velocity head in excess of frictional resistance, at 3 m water column static pressure, $v$ has to be 2.13 m/sec or more which assures consistency with laminar flow at velocity and energy inputs well below those associated with the maximum velocity for laminar flow (6.75 m/sec). If the same vinegar has to be filtered without the use of filter aid particles, one must know that $Q/q$ of Acetobacter is 4.3 and $\lambda = .3$. If a static pressure of 3 m water column is chosen fluid velocity has to be higher than 8.7 m/sec in order to maintain velocity head in excess of frictional resistance. But laminar flow ends at 6.76 m/sec. Therefore a static pressure as high as 3 m (4.2 psi) cannot be chosen. If it is fixed at 1.5 m water column (2.84 psi) fluid velocity must exceed 6.1 m/sec and this velocity is within the laminar range. Filtration without filter aid is therefore also possible but needs higher energy input to the fluid.

Velocity and static pressure to be chosen for a filtration can easily be calculated, if cross-section ratio of the particles to be filtered and their fric-tional coefficient are known. A static pressre is chosen and the velocity term, calculated with the formula page 8 of the specification, gives the lowest possible fluid velocity. Now from the dimensions of the filter channel anda Reynolds Number below 100,000 the upper limit of the fluid velocity is found. Velocity can then be chosen within these two limits. Claiming laminar flow and a velocity head surpassing the frictional resistance enables the user to chose the right static pressure and fluid velocity for every filtration. Attention must be drawn to the fact that fluid velocity increases or decreases with the square of the ststic pressure. This explains, why the prior art literature states.

"in turbulent flow systems, astronomically high fluid velocities, large pressure drops and necessarily high fluid recirculation rates are required to achieve ultrafiltration much over 10–15 gfd."

As mentioned above, the Reynolds No. is proportional to the hydraulic diameter of the apparatus. The hydraulic diameter is defined as quotient of the quadruple cross-section of the channel and the circumference of this cross-section.

$$\text{hydraulic Diameter } D = \frac{b \cdot h \cdot 4}{2(b+h)}$$

b = width of the channel
h = height of the channel

For example, the filter, mentioned under (d) with 125 mm width and 10 mm height of the channel has a hydraulic diameter of .0185 m.

Literature recommends to reduce the height of the channel to 5 mils that is .12 mm. If the height of this filter was reduced to .12 mm, its hydraulic diameter would be reduced to .00024 m. This 1/77 of .0185. This means that in this thin channel fluid velocity can be 77 fold the value of the velocity in the heigh channel while still giving the same Reynolds Number. Therefore in the thin channel apparatus the velocity can be chosen about 77 times as high and the flow is still laminar. This means that under these conditions static pressure can be about 8.8 times ($\sqrt{77}$) as high as in the heigh channel, what means up to about 37 psi, following the teaching of the present invention. This is exactly what literature states as possible pressure for thin channel process: "5 – 100 psi" (Ref. R, page 57, line 33)

Of course the thin channel process too must follow the equation of page 8 of the specification of the present invention. It can only work, if the velocity head exceeds the frictional resistance caused by the static pressure. But the theoretical relation not being known, the one possibility only to use thin channels was found by trial and error and the other possibility to reduce the static pressure drastically remained uncovered.

This calculation explains why prior to the present invention nobody had the idea to avoid polarization concentration in high channels by reducing the static pressure so drastically. Thin channels were found as a solution to avoid polarization concentration where much higher pressures are still possible. There is not the slightest hint in all the literature that also high channels can be used at very low pressures.

Attention must also be drawn to the fact that in the present application there is no limitation with regard to the channel height. Thin channels can and therefore did work with higher pressures. That they can also work with low pressures is new, too. High channels to the contrary must work with low pressure. This is the new art.

Therefore the invention as claimed in the application is not a simple extension of a method already known and obvious to those skilled in the art but opens a new range for Ultra-filtration of liquids that contain microorganisms, macromolecules or other finely divided solid matter, which had not been known prior to this application.

It is intended that the above disclosure shall be read as illustrative and not in a limiting sense. The invention comprises each and every word device or method herein disclosed and is limited only by the scope and spirit of the appended claims.

What is claimed is:

1. Process for continuous filration of liquids that contain microorganisms or other finely divided particles to be filtered the steps of,
    moving the liquid to be filtered parallel to a flat elongated membrane filter surface with pore diameters between 0.2 and 20 microns and more particularly selected in relation to the particles to be filtered to prevent transport of said particles through the filter,
    maintaining flow conditions of laminar flow along the surface and maintaining hydrostatic pressure of no greater than 4.2 psi perpendicular to the filter surface,
    adjusting velocity of the moving liquid wherein said velocity is adjusted so that the hydrodynamic pressure $v^2/2g$ created by it and acting parallel to the filter surface is maintained greater than the product of said hydrostatic pressure times the coefficient of sliding friction of said particles on the filter surface times the ratio of the maximum to the minimum crossectional area of said particles so that the force created by hydrodynamic pressure, $v^2/2g$, and acting parallel to the filter surface on the particles exceeds the sliding friction of the particles to counteract concentration polarization tendencies and extend effective filtering time of the process at essentially constant filtration rates compared to running at hydrostatic pressure above 4.2 psi under otherwise identical conditions,
    and adding filtering aid particles, whose masses exceed those of the particles to be filtered by at least two factors of ten, to the liquid to be filtered, the filtering aids having a lower cross-sectional area ratio than that of said particles to be filtered and being present in an effective amount to reduce the apparent cross-section area ratio of said particles consistent with maintaining said relation of hydrodynamic pressure forces to friction resistance force and said laminar flow.

2. Process in accordance with claim 1 wherein following the said motion parallel to the filter surface, the nonfiltered portion of the liquid to be filtered is collected in an intermediate container, removed from there anew and moved parallel to the filter surface, and this process is repeated at least once.

3. Process in accordance with claim 1 wherein
    said filtering aid particles have a static coefficient of sliding friction at the membrane filter smaller than 0.3 and a ratio of the maximum to the minimum cross-sectional areas between 1.0 and 2.0.

4. Process in accordance with claim 3 wherein
    cellulose particles in an amount of 0.01 – 1.0% by weight with respect to the liquid to be filtered are used as filtering aid.

5. Process in accordance with claim 4 wherein
    following the said motion parallel to the filter surface, the nonfiltered portion of the liquid to be filtered is collected in an intermediate container, removed from there anew and moved parallel to the filter surface and this process is repeated at least once.

6. Process in accordance with claim 1 wherein the liquid filtered comprises fermentation-produced vinegar and wherein the membrane has pore diameters of 0.2–0.3 microns constructed and arranged to essentially prevent passage therethrough of bacteria in the vinegar, and further comprising, maintaining such flow over the membrane over a running length of at least one foot with a liquid height of at least one millimeter and recirculating the liquid in a closed loop circuit containing a flow path along said membrane and also an intermediate container.

7. Process in accordance with claim 6 wherein the amount of liquid circulated in said closed loop is maintained constant by adding unfiltered vinegar to said container from time-to-time, and further comprising, continuing said recirculation of a thus maintained constant amount of liquid and said filtration over a time period of at least 5 days.

8. Process in accordance with claim 7 wherein said filter aid particles are selected to provide a coefficient of sliding friction at the membrane filter no greater than 0.3 and a ratio of maximum to minimum cross-sectional area of said filtering particles between 1.0 and 2.0.

9. Process in accordance with claim 8 wherein said filter aid particles comprise cellulose particles and wherein said particles are provided in an amount of .01–1.0% by weight, with respect to the vinegar flowing in said closed loop circuit.

10. Apparatus for carrying out the process in accordance with claim 6 comprising, means defining said filter channel with a filter wall and a channel height greater than one millimeter and channel length greater than one foot,
means defining said recirculation liquid flow loop,
means for pumping liquid through said loop, means for regulating the hydrostatic pressure and the liquid velocity.

11. Apparatus in accordance with claim 10 wherein said channel defining means comprise opposed filter plates with a channel height therebetween of 6 – 25 millimeters with a converging inlet and diverging outlet, said circulating loop comprising circular pipes and said inlet and outlet providing circular-to-rectangular section transitions.

12. Process for continuous ultrafiltration of a liquid containing bacteria particles and the like comprising, flowing the liquid through a channel having a wall defined by an elongated membrane filter surface with pore diameters between 0.2 and 2.0 microns and having a cross section span perpendicular to the wall greater than one millimeter and a length of at least one foot,
maintaining a hydrostatic pressure of said fluid perpendicular to the filter surface of no greater than 4.2 psi and a hydrodynamic pressure $v^2/2g$, such that force created thereby on the particles exceeds the sliding friction of the particles so that concentration polarization is avoided,
and maintaining laminar flow of the fluid through the channel consistent with the foregoing conditions,
and recirculating the liquid through said channel in multiple passes over a time period of more than 5 days.

13. Process in accordance with claim 12 and further comprising, adding filter aid particles in an amount of .01 – 1.0% by weight of the recirculating liquid to the liquid.

14. Process in accordance with claim 13 and further comprising, collecting liquid from the recirculating path and adding fresh liquid thereto while continuing the recirculation.

15. Apparatus for carrying out a continuous ultrafiltration of finely divided particles suspended in a liquid process comprising, at least one container for the liquid to be filtered,
filter means comprising at lease one elongated filter channel at least one mm. high bounded on at least one surface by a flat elongated membrane filter with pore diameters between 0.2 and 20 microns and more particularly selected in relation to the particles to be filtered to prevent transport of said particles through the filter,
a centrifugal pump connected in fluid communication with said container and filter in a recirculating loop and providing a hydrostatic pressure of liquid with the filter of no greater than 4.2 psi and a dynamic pressure of said liquid which provides a force at the membrane surface exceeding the frictional resistance force of particles thereon,
the filter means having a rectangular inner cross-section,
and means for maintaining laminar flow of liquid in the filter means.

16. Apparatus in accordance with claim 15, wherein the filter means has a middle rectangular filter frame and two filter plates arranged on both sides of the filter frame, wherein the filter frame has inflow and outflow channels at the end faces and the filter plates have, on their sides directed toward the filter frame, grooves to collect the filtrate and also a porous base to support the membrane filters and filtrate discharges, and that a membrane filter and a seal are arranged between the filter frame and each filter plate.

17. Apparatus in accordance with claim 16, wherein the filter frame is conically enlarged at the end faces and the inflow and outflow channels change over outside the filter frame with constant cross-sectional area into circular pipes comprising portions of said circulating loop of liquid flow.

18. Apparatus in accordance with claim 15, further comprising, an intermediate container equipped with a level regulator for the liquid to be filtered which is connected by a conduit to a main container, and by a conduit which leads from the intermediate container, across the centrifugal pump, a temperature device and one or more filter elements and back again to the intermediate container,
and wherein the filtrate discharges from the filter plates discharge through a conduit into a filtrate container from which a filtrate pump pumps the filtrate to a filtrate container through a pipe.

19. Apparatus in accordance with claim 18, further comprising means for stopping the circulating pump upon occurrence of turbidity, said means comprising photoelectric turbidity detection means.

20. Apparatus in accordance with claim 15 comprising, means defining said channel with a filter wall and a channel height greater than one millimeter and channel length greater than one foot.

21. Apparatus in accordance with claim 20 wherein said channel defining means comprise a converging inlet and diverging outlet.

22. Apparatus in accordance with claim 21 wherein said channel defining means comprise opposed filter plates with a channel height therebetween of 5–25 mm., said circulating loop comprising circular pipes, and said inlet and outlet providing circular-to-rectangular section transitions.

23. Apparatus in accordance with claim 15 and further comprising, means defining a closed loop recirculation circuit for circulating liquid in a loop running adjacent said flat elongated membrane filter and having a portion of said circuit away from said filter and having an intermediate container in said further portion, said flow circuit comprising a channel at least one millimeter high and at least one foot long adjacent said elongated membrane filter, the portion of said recirculating flow path adjacent the filter comprising a channel of rectangular inner cross-section and further comprising means to regulate hydrostatic presure and velocity of liquid along the filter surface thereby maintaining laminar flow in liquid flowing adjacent the membrane filter.

24. Apparatus in accordance with claim 23 wherein said filter means comprises a middle rectangular filter frame sandwiched between two filter plates, the filter frame having inflow and outflow channels at end faces thereof and the filter plates having on sides thereof facing the filter frame therebetween, grooves to collect filtrate and a porous base to support the elongated membrane filters and filtrate discharges, and wherein a membrane filter and a seal are arranged between the filter frame and each filter plate.

25. Apparatus in accordance with claim 24 wherein the filter frame is conically enlarged at said end faces and the inflow and outflow channels change over outside the filter frame with constant cross sectional area into circular conduits comprising portions of said recirculating loop liquid flow.

26. Apparatus in accordance with claim 25, and further comprising, a level regulator for the liquid to be filtered in said intermediate container which is connected by a conduit to a main container, and said circulating loop being formed by a conduit, said centrifugal pump, regulating valves, a temperature regulating device and one or more filter elements, and wherein the filtrate discharges from the filter plates through a conduit into a filtrate container from which a filtrate pump pumps the filtrate to a second filtrate container through a pipe.

27. Apparatus in accordance with claim 26, and further comprising, means for stopping the circulating pump upon occurrence of turbidity, said means comprising photoelectric turbidity detection means.

* * * * *

UNITED STATES PATENT OFFICE
CERTIFICATE OF CORRECTION

PATENT NO. : 3,974,068
DATED : August 10, 1976
INVENTOR(S) : Heinrich Ebner et al.

It is certified that error appears in the above-identified patent and that said Letters Patent are hereby corrected as shown below:

Column 5, line 33, please insert fraction bar between $v^2$ and 2g.

Column 12, line 14, the formula should read $$p \cdot \frac{\lambda}{\rho \cdot g} \cdot \frac{Q}{2}$$

Column 12, line 53, "Velocity and static pressure to be chosen" should read --A static pressure is chosen--.

Column 13, line 14, "$\frac{b \cdot h \cdot 4}{2(b+h)}$" should read --$\frac{b \cdot h \cdot 4}{2(b+h)}$--.

Column 10, line 2, "(Run 2)" should read --(Run 1)--.

Signed and Sealed this

Twenty-sixth Day of December 1978

[SEAL]

Attest:

RUTH C. MASON
Attesting Officer

DONALD W. BANNER
Commissioner of Patents and Trademarks